W. J. FRANCKE.
SHAFT COUPLING.
APPLICATION FILED JAN. 10, 1917.
1,263,222.
Patented Apr. 16, 1918.
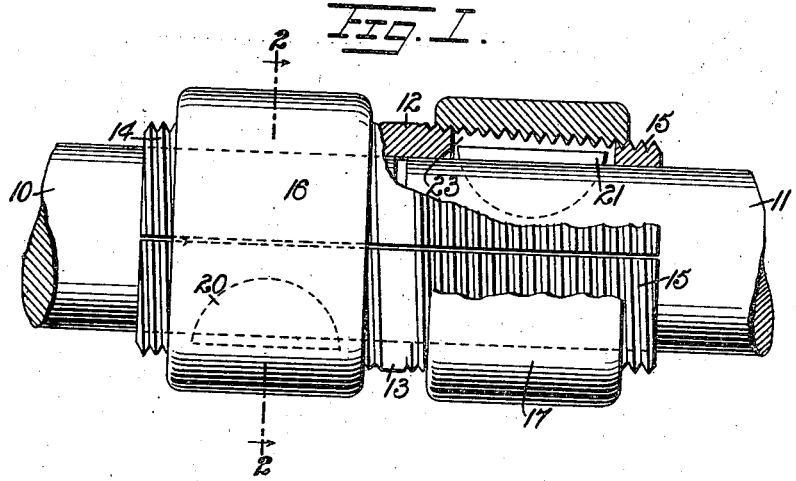
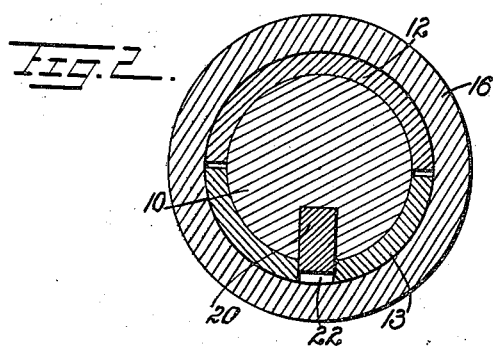
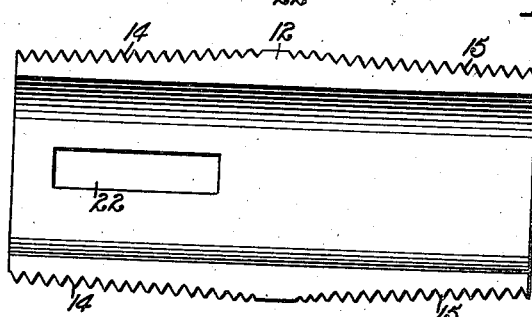
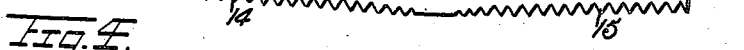
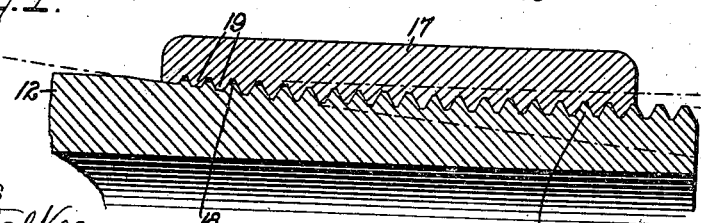
WITNESSES
H. J. Walker
INVENTOR
W. J. Francke
BY
ATTORNEYS

UNITED STATES PATENT OFFICE.

WILLIAM J. FRANCKE, OF HIGHLAND PARK, NEW JERSEY, ASSIGNOR TO THE FRANCKE CO., OF NEW BRUNSWICK, NEW JERSEY, A CORPORATION OF NEW JERSEY.

SHAFT-COUPLING.

1,263,222.      Specification of Letters Patent.      Patented Apr. 16, 1918.

Application filed January 10, 1917. Serial No. 141,575.

*To all whom it may concern:*

Be it known that I, WILLIAM J. FRANCKE, a citizen of the United States, and a resident of Highland Park, in the county of Middlesex and State of New Jersey, have invented a new and Improved Shaft-Coupling, of which the following is a full, clear, and exact description.

The object of the invention is to provide a new and improved shaft coupling, which is simple and durable in construction, cheap to manufacture, and arranged to permit of quickly and conveniently coupling the adjacent ends of alined shafts together.

In order to accomplish the desired result a sleeve is used, made in sections, and adapted to fit onto the ends of the shafts to be coupled, the sleeve tapering from the middle to the ends and the tapered portions having threads, of which the innermost gradually diminishes in depth, and nuts screwing on the said threaded sleeve portions and having flaring entrance ends screwing onto the reduced threads.

A practical embodiment of the invention is represented in the accompanying drawings forming a part of this specification, in which similar characters of reference indicate corresponding parts in all the views.

Figure 1 is a side elevation of the shaft coupling with parts shown in section;

Fig. 2 is a cross section of the same on the line 2—2 of Fig. 1;

Fig. 3 is an inverted plan view of one of the sleeve sections; and

Fig. 4 is an enlarged sectional side elevation of a portion of the sleeve member and its nut screwing thereon.

Onto the adjacent ends of the shafts 10 and 11 to be coupled together fits a sleeve made in two longitudinal sections 12 and 13 and tapering in opposite directions from the middle to the ends. The tapering portions of the sleeve are provided externally with screw threads 14 and 15 on which screw nuts 16 and 17 to clamp the sleeve sections 12 and 13 firmly in place on the shafts 10 and 11, thus coupling the shafts together. The screw threads 14 and 15 are standard threads and are cut by the usual single piece die such as is used for threading pipes, and as this die is made to Brigg's standard and is therefore chamfered at its entrance end it is evident that the innermost threads 18 gradually diminish in depth, as plainly illustrated in Fig. 4. Each of the nuts 16 and 17 is provided with a chamfered or flaring entrance and having its thread 19 reduced in depth and fitting the threads 18 so that the entire length of each nut 16 and 17 is in engagement with the corresponding threaded portions 14 and 15. It is understood that on screwing up the nuts 16 and 17 on the tapering threaded portions 14 and 15 of the sleeve, the sections thereof are pressed in firm contact with the ends of the shafts 10 and 11 to couple the latter together.

The sleeve is preferably keyed to the shafts 10 and 11, and for this purpose the shafts 10 and 11 are provided with keys 20 and 21, of which the key 20 projects into a slot 22 formed in the sleeve section 13, and the key 21 extends into a slot 23 formed in the sleeve section 12. The slots 22 and 23 are so arranged that when the nuts 16 and 17 are screwed up then they cover the slots, and the keys 20 and 21 project into the slots.

The sleeve and the nuts are preferably provided with standard pipe threads such as are used in the fittings of pipe couplings and hence such pipe fittings modified as above described may be advantageously used for shaft couplings.

Having thus described my invention, I claim as new and desire to secure by Letters Patent:—

1. A shaft coupling, comprising a sleeve made in longitudinal sections and adapted to fit on to the adjacent ends of the shafts to be coupled, the sleeve having exterior tapered and threaded portions extending from the middle to the ends and each section being provided with a slot, a key carried by each shaft end and projecting into a slot of a sleeve section, and nuts screwing on the tapered threaded portions of the sleeve, the nuts covering the slots of the sleeve sections and the keys therein.

2. A shaft coupling, comprising a sleeve made in sections and adapted to fit onto the adjacent ends of the shafts to be coupled together, the sleeve having exterior tapered portions extending from the middle to the ends and the said tapered portions being provided with screw threads, the inner threads of which gradually diminish in depth toward the middle of the sleeve, the sleeve having slots, keys seated in the said shaft ends and projecting into the said slots, and nuts screwing on the said threaded tapered portions of the sleeve and having flaring entrance ends screwing onto the reduced threads of the sleeve, the nuts covering the said slots and the keys therein.

WILLIAM J. FRANCKE.